United States Patent Office 3,321,401
Patented May 23, 1967

3,321,401
LUBRICATING COMPOSITIONS
John Frederick Ford, Camberley, and Peter Michael Blanchard, West Molesey, England, assignors to The British Petroleum Company Limited, London, England, a company of England
No Drawing. Filed Sept. 8, 1965, Ser. No. 485,949
Claims priority, application Great Britain, Sept. 18, 1964, 38,165/64
26 Claims. (Cl. 252—46.7)

This invention relates to lubricating compositions containing a combination of additives that has the effect of improving the load-carrying properties of the composition.

According to the invention, there is provided a lubricating composition comprising a lubricating base oil having dissolved therein small proportions each of (a) an organic phosphite of the formula

(Formula I)

where the $R^1$s are alkyl, cycloalkyl, aryl or aralkyl groups and the total number of carbon atoms in the molecule is 1 to 20 and (b) another oil-soluble organic phosphorus compound of the general formula

(Formula II)

where X is an oxygen or sulphur atom and Y is $R^1O-$ or

where $R^1$ has the value previously given, $R^2$ and $R^3$ are hydrogen or alkyl, cycloalkyl, aryl or aralkyl groups or together with the nitrogen atom form a ring which, apart from the nitrogen, is made up of hydrocarbon groups or hydrocarbon groups and a second hetero atom, e.g. oxygen, and the total number of carbon atoms in the molecule is 1 to 30.

The Base Oil

The lubricating base oil may be a refined mineral oil obtained from petroleum, or a synthetic lubricating oil e.g. an organic ester, a polyglycol ether, a polyphenyl ether, a silicate ester, a silicone oil or mixture thereof.

Suitable mineral oils are those having a viscosity at 210° F. within the range 3–50 centistokes and a viscosity index within the range 50–110.

The most important class of synthetic oils are the organic liquid polyesters, particularly the neutral polyesters, having a viscosity at 210° F. within the range 1–30 centistokes. The expression "polyester" is used in this specification to mean esters having at least two ester linkages per molecule. The expression "neutral" is used to mean a fully esterified product. Examples of suitable polyesters include liquid diesters of aliphatic dicarboxylic acids and monohydric alcohols (e.g. dioctyl sebacate, dinonyl sebacate, octyl nonyl sebacate, and the corresponding azelates and adipates), liquid diesters of aliphatic dicarboxylic acids and phenols (e.g. those described in copending United Kingdom patent applications 29,292/63, 19,687/63, 40,176/63, 10,486/64 and 31,249/65), and more complex polyesters (e.g. those described in United Kingdom patent specifications 666,697, 743,571, 780,034, 861,962, 933,721, 971,901 and 986,068 and in co-pending United Kingdom patent application 31,249/65).

The combination of additives (a) and (b) identified above has been found to be particularly effective in base oils consisting of an comprising one or more netural polyesters having a viscosity of 1–30, perferably 1–19, centistokes at 210° F. that have been prepared by reacting together under esterification conditions and in one or more stages:

(i) a mono- and/or polyhydric alcohol having 5–15, preferably 5–8, carbon atoms per molecule and having no hydrogen atoms attached to any carbon atom in a 2 position with respect to any —OH group and,
(ii) a mono- and/or polycarboxylic acid having 2–14, preferably 6–10, carbon atoms per molecule.

It is to be understood that in this esterification reaction there may be used more than one of any of the reactants mentioned, e.g. a mixture of monocarboxylic acids, and, in any case, the neutral ester product of the esterification reaction will sometimes consist of a mixture of different ester molecules, so the expression "polyester" is to be contrued in this light.

Polyesters that are especially suitable for use in the compositions according to the invention are those made from the following acids and alcohols: caprylic acid, capric acid, caproic acid, enanthic acid, pelargonic acid, adipic acid, sebacic acid, azelaic acid, tricarballylic acid, 2:2:4-trimethylpentanol, neopentyl alcohol, neopentyl glycol, trimethylolpropane and pentaerythritol.

Examples of such suitable polyesters are: (a) esters of trimethylolpropane and/or pentaerythritol with one or more of the monocarboxylic acids mentioned in the previous paragraph and (b) complex esters prepared from trimethylolpropane, sebacic and/or azelaic acid, and one or more of the monocarboxylic acids mentioned in the previous paragraph. Most suitably, the trimethylolpropane and dicarboxylic acid are reacted in the molar ratio of 1:0.05–0.75, preferably 1:0.075–0.4, the amount of monocarboxylic acid being sufficient to provide a carboxyl/hydroxyl balance in the reactants.

The additives

The proportion of additive (a) in the composition is preferably 0.001–0.5% by weight and of additive (b) 0.01 to 10%, preferably 0.5–5% by weight.

Preferably additive (a) is a compound of Formula I where the $R^1$s are alkyl groups having 1–10 carbon atoms, e.g. butyl groups.

Examples of suitable phosphorus compounds that may be use as additive (b) are the following:
(1) Phosphates of the formula

(Formula III)

where the $R^1$s have the values given previously and the total number of carbon atoms in the molecule is 1–30.

Preferred phosphates are those of Formula III in which the $R^1$s are alkyl groups having 1–10 carbon atoms, phenyl groups or tolyl groups.

(2) Phosphorothionates of the formula

(Formula IV)

where the $R^1$s have the values given previously and the total number of carbon atoms in the molecule is 1–30.

Preferred phosphorothionates are those of Formula IV in which the $R^1$s are alkyl groups having 1–10 carbon atoms, phenyl groups or tolyl groups.

(3) Phosphoramidates of the formula

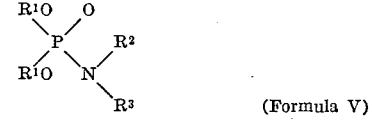
(Formula V)

where the $R^1$s, $R^2$ and $R^3$ have the values given previously and the total number of carbon atoms in the molecule is 1–30.

Preferred phosphoramidates are those of Formula V in which the $R^1$s are alkyl groups having 3–12 carbon atoms (especially $C_4$), $R^2$ is hydrogen and $R^3$ is hydrogen or an alkyl or cycloalkyl group having 1–20 carbon atoms, e.g. butyl, octyl, lauryl or cyclohexyl.

Examples of specially preferred phosphoramidates are N-lauryl dibutyl phosphoramidate, N-butyl dibutyl phosphoramidate, N-octyl dibutyl phosphoramidate and N-cyclohexyl dibutyl phosphoramidate. Examples of other sitable phosphoramidates are dibenzyl phosphoramidate, dibutyl anilinophosphonate, N-benzyl dibutyl phosphoramidate and dibutyl morpholinophosphonate.

Certain of these phosphoramidates, e.g. the diphenyl and dibenzyl phosphoramidates, are fairly high melting point solids which have only a small solubility in lubricating oils. The solubility of these compounds can be increased by the addition of a minor amount of a primary or secondary, alkyl or cycloalkyl amine, e.g. cyclohexylamine, dodecylamine or di-n-amylamine, but it is preferred to use the phosphoramidates which have solubilities of at least 1% by weight in the lubricating oil, e.g. the dibutyl and other dialkyl phosphoramidates and their derivatives.

*Examples*

By way of example, tests were carried out on a number of lubricating compositions according to the invention, and, for comparison, on the base oils and a number of compositions containing either the phosphite additive (a) or the other phosphorus additive (b).

The load-carrying properties of the copositions were assessed by the well-known 4-ball test. The results of the tests are given in Tables 1, 2, 3 and 4. In the tables, the abbreviation MHL is used to signify Mean Hertz Load.

TABLE 1

Base oil: Di-(2-ethylhexyl) sebacate.
Period of tests: 10 seconds.

| Tritolyl phosphate Concentration, Percent wt. | Dibutyl phosphite Concentration, Percent wt. | MHL kg. |
|---|---|---|
| None | None | 20 |
| None | 0.2 | 22 |
| 5 | None | 33 |
| 5 | 0.1 | 44 |
| 5 | 0.05 | 42 |
| 5 | 0.02 | 42 |

TABLE 2

Base oil: SAE 90 grade refined mineral oil.
Period of test: 60 seconds.

| N-lauryl dibutyl Phosphoramidate | Dibutyl phosphite, Percent wt. | MHL, kg. |
|---|---|---|
| None | None | 23 |
| None | 0.05 | 24.8 |
| 1.5 | None | 35 |
| 1.5 | 0.05 | 43.2 |

TABLE 3

Base oil: SAE 90 grade refined mineral oil.
Period of test: 60 seconds.

| Additive (b), percent wt. | Dibutyl phosphite, percent wt. | MHL, kg. |
|---|---|---|
| None | None | 27.7 |
| None | 0.05 | 25.8 |
| N-octyl dibutyl (1.286) | None | 33.9 |
| Phosphoramidate (1.286) | 0.05 | 40.0 |
| Triphenyl (1.304) | None | 26.8 |
| Phosphate (1.304) | 0.05 | 32.1 |
| Triphenyl (1.368) | None | 30.9 |
| Phosphorothionate (1.368) | 0.05 | 36.8 |

TABLE 4

Base oil: Complex ester from—

| | Moles |
|---|---|
| Caprylic acid | 10 |
| Trimethylolpropane | 4 |
| Sebacic acid | 1 |

Test temperature 200° C. (to simulate high gear operating temperatures).
Period of test: 60 seconds.

| Additives | None | Tritolyl phosphate, 4.0 percent wt. | Tritolyl phosphate, 4.0 percent wt; Dibutyl phosphite, 0.5 percent wt. |
|---|---|---|---|
| Initial Seizure Load, kg | 15 | 35 | 55 |
| Weld Load, kg | 130 | 130 | 140 |
| Mean Hertz Load, kg | 11.19 | 13.66 | 19.33 |

Tests were also carried out in the well-known IAE Gear Machine and the results are given in Tables 5 and 6.

TABLE 5

Base oil: Complex ester from—

| | Moles |
|---|---|
| Caprylic acid | 10 |
| Trimethylolpropane | 4 |
| Sebacic acid | 1 |

| Load carrying additives | None | | Tritolyl phosphate, 4.0% wt. | | Tritolyl phosphate, 4.0% wt.; Dibutyl phosphite, 0.05% wt. | |
|---|---|---|---|---|---|---|
| Temperature, °C | 110 | 200 | 200 | | 110 | 200 |
| Pinion speed, r.p.m | 2,000 | 6,000 | 2,000 | 6,000 | 2,000 | 6,000 | 2,000 | 6,000 |
| Lever arm scuffing load, lb | 69.4 | 33 | 35 | 15.8 | 55 | 79 | 50 | 77.5 | 26 |

TABLE 6

Base oil: Complex ester from—

| | Moles |
|---|---|
| Caprylic acid | 28 |
| Trimethylolpropane | 10 |
| Sebacic acid | 1 |

| Load carrying additives | None | Tritolyl phosphate, 2.0% wt. | Tritolyl phosphate, 2.0% wt.; Dibytyl phosphite, 0.05% wt. |
|---|---|---|---|
| Temperature, °C | 110 | 110 | 110 |
| Pinion speed, r.p.m | 6,000 | 6,000 | 6,000 |
| Lever arm scuffing load, lb | 30 | 30 | 42.5 |

It will be seen from the tables, that the phosphate, phosphoramidate and phosphorothionate additives in most cases improved the load-carrying properties of the base oil as would be expected. The further addition of a very small quantity of dibutyl phosphite gave rise to an unexpectedly large increase in load-carrying ability even at high temperatures although the same amount of the phosphite when used alone gave little or no improvement. In other words, the data in the tables show that there is a synergistic effect between the phosphite additive on the one hand and the other phosphorus additive on the other. This effect is very significant because the increase in load-carrying ability that can be obtained with increasing amounts of additive (b) when used alone gets progressively less and the amount of load-carrying increase that can be obtained with additive (a) alone is severely limited by the fact that it renders the oil very corrosive, especially to copper, when used at more than the very small concentrations perviously indicated.

In the general formulae used in this specification, it is to be understood that where the same symbol is used more than once to represent a group of radicals, the radical need not be the same at each occurrence. For example, in Formulae I–V, the $R^1$s may be either the same or different in any given molecule.

The phosphoramidates are also sometimes referred to as aminophosphonates. Thus the N-lauryl dibutyl phosphoramidate is alternatively known as dibutyl laurylaminophosphonate.

We claim:
1. A lubricating composition comprising a lubricating base oil having dissolved therein
   (a) from about 0.001 to 0.5% by weight of the composition of an organic phosphite having the formula

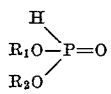

wherein $R_1$ and $R_2$ are each selected from the group consisting of alkyl and cycloalkyl having from 1 to about 10 carbon atoms, and
   (b) from about 0.01 to 10% by weight of the composition of an organic phosphorus compound having the formula

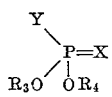

in which X is oxygen or sulfur, Y is an amino group of the formula

or a hydrocarbonoxy group of the formula $R_7O-$ and wherein each of $R_3$, $R_4$, and $R_7$ is selected from the group consisting of alkyl, cycloalkyl, aryl and aralkyl and each of $R_5$ and $R_6$ is selected from the group consisting of hydrogen, alkyl, cycloalkyl and aralkyl, the molecule of the said organic phosphorus compound containing a total of up to 30 carbon atoms.

2. A lubricating composition as in claim 1 wherein the organic phosphite is dibutyl phosphite, having the formula $(C_4H_9)_2HP=O$.

3. A lubricating composition as in claim 1 wherein the organic phosphorus compound is a tri-hydrocarbon phosphate in which Y is $R_7O$ and X is oxygen.

4. A lubricating composition as in claim 3 wherein the organic phosphite present along with the trihydrocarbon phosphate is dibutyl phosphite.

5. A lubricating composition as in claim 4 wherein the phosphate is tritolyl phosphate.

6. A lubricating composition as in claim 4 wherein the phosphate is triphenyl phosphate.

7. A lubricating composition as in claim 3 wherein $R_3$, $R_4$ and $R_7$ are each selected from the group consisting of phenyl, tolyl and alkyl groups having from 1 to 10 carbon atoms.

8. A lubricating composition as in claim 1 wherein the organic phosphorus compound is a phosphoramidate in which Y is

X is oxygen, $R_5$ is hydrogen, $R_6$ is hydrogen or an alkyl or cycloalkyl group having from 1 to 20 carbon atoms and each of $R_3$ and $R_4$ contains from 3 to 12 carbon atoms.

9. A lubricating composition as in claim 8 wherein the phosphite present along with the phosphoramidate is dibutyl phosphite.

10. A lubricating composition as in claim 9 wherein the phosphoramidate is N-octyl dibutyl phosphoramidate or N-lauryl dibutyl phosphoramidate.

11. A lubricating composition as in claim 1 wherein the organic phosphorus compound is a trihydrocarbon phosphorothionate in which X is sulfur and Y is $R_7O$.

12. A lubricating composition as in claim 11 wherein the phosphite present along with the phosphorothionate is dibutyl phosphite.

13. A composition as in claim 11 wherein the phosphorothionate is diphenyl phosphorothionate.

14. A lubricating composition comprising a lubricating base oil that is an organic liquid neutral polyester having a viscosity within the range of about 1 to 30 centistokes, the base oil having dissolved therein
   (a) from 0.001 to 0.5% by weight of the composition of an organic phosphite of the formula

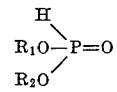

wherein each of $R_1$ and $R_2$ is an alkyl or cycloalkyl group having up to about ten carbon atoms, and
   (b) from 0.5 to 5% by weight of the composition of an organic trihydrocarbon phosphate in which each of the three hydrocarbon substituents contains up to ten carbon atoms, is attached to phosphorus through an oxygen atom and selected from the group consisting of alkyl, aryl, cycloalkyl and aralkyl, the hydrocarbon phosphate containing four oxygen atoms and up to about 30 carbon atoms.

15. A composition as in claim 14 wherein $R_1$ and $R_2$ are butyl.

16. A composition as in claim 15 wherein the trihydrocarbon phosphate is tritolyl phosphate.

17. A composition as in claim 15 wherein the trihydrocarbon phosphate is triphenyl phosphate.

18. A composition as in claim 14 wherein the organic phosphite is present in an amount of from about 0.02 to 0.05% by weight of the composition.

19. A lubricating composition according to claim 14, in which the polyester is a diester of an aliphatic dicarboxylic acid and a monohydric alcohol.

20. A lubricating composition according to claim 14, in which the diester is dioctyl sebacate, dinonyl sebacate, octyl nonyl sebacate or the corresponding azelates or adipates.

21. A lubricating composition according to claim 14, in which the polyester has been prepared by reacting together under esterification conditions and in one or more stages:
   (i) a mono- and/or polyhydric alcohol having 5–15 carbon atoms per molecule and having no hydrogen atoms attached to any carbon atoms in a 2 position with respect to any —OH group and,
   (ii) a mono- and/or polycarboxylic acid having 2–14 carbon atoms per molecule.

22. A lubricating composition according to claim 21, in which the polyester has been made from acids and alcohols selected from the following: capyrlic acid, capric acid, caproic acid, enanthic acid, pelargonic acid, adipic acid, sebacic acid, azelaic acid, tricarballylic acid, 2:2:4-trimethylpentanol, neopentyl alcohol, neopentyl glycol, trimethylolpropane and pentaerythritol.

23. A lubricating composition according to claim 21, in which the polyester is an ester of trimethylolpropane and/or pentaerythritol with one or more of the following monocarboxylic acids: caprylic acid, capric acid, caproic acid, enanthic acid and pelargonic acid.

24. A lubriating composition according to claim 21, in which the polyester is a complex ester prepared from trimethylolpropane, sebacic acid and/or azelaic acid and one or more of the following monocarboxylic acids: caprylic acid, capric acid, caproic acid, enanthic acid and pelargonic acid.

25. A lubricating composition according to claim 24, in which the trimethylolpropane and dicarboxylic acid have been reacted in the molar ratio of 1:0.05–0.75 the amount of monocarboxylic acid being sufficient to provide a carboxyl/hydroxyl balance in the reactants.

26. A lubricating composition according to claim 25, in which the said ratio is 1:0.075–0.4.

References Cited by the Examiner

UNITED STATES PATENTS

| | | | |
|---|---|---|---|
| 2,146,584 | 2/1939 | Lipkin | 252—46.7 |
| 2,157,452 | 5/1939 | Humphreys | 252—46.6 |
| 2,220,851 | 11/1941 | Schreiber | 252—46.6 |
| 2,242,260 | 5/1941 | Prutton | 252—46.6 |
| 3,218,256 | 11/1965 | Edwards et al. | 252—47.5 |

DANIEL E. WYMAN, *Primary Examiner.*

L. G. XIARHOS, W. H. CANNON,
*Assistant Examiners.*

UNITED STATES PATENT OFFICE
CERTIFICATE OF CORRECTION

Patent No. 3,321,401                                                    May 23, 1967

John Frederick Ford et al.

It is hereby certified that error appears in the above numbered patent requiring correction and that the said Letters Patent should read as corrected below.

Column 1, line 49, for "mixture" read -- mixtures --; column 2, line 1, for "an" read -- or --; same line 1, for "netural" read -- neutral --; line 2, for "perferably 1-19" read -- preferably 1-10 --; line 46, for "use" read -- used --; column 3, line 13, for "sitable" read -- suitable --; line 47, for "copositions" read -- compositions --; line 48, for "4-ball" read -- 4-Ball --; column 4, in TABLE 6, in the heading to the fourth column, line 2 thereof, for "Dibytyl" read -- Dibutyl --; column 5, line 3, for "perviously" read -- previously --; column 6, line 65, for "capyrlic" read -- caprylic --; line 75, for "lubriating" read -- lubricating --.

Signed and sealed this 28th day of November 1967.

(SEAL)
Attest:

EDWARD M. FLETCHER, JR.                                EDWARD J. BRENNER
Attesting Officer                                          Commissioner of Patents